United States Patent [19]

Boyer

[11] Patent Number: 5,533,039

[45] Date of Patent: Jul. 2, 1996

[54] FAULT TOLERANT FIBER OPTIC PROTOCOL FOR DETERMINING BEGINNING OF DATA

[75] Inventor: Keith G. Boyer, Northglenn, Colo.

[73] Assignee: Storage Technology Corporation, Louisville, Colo.

[21] Appl. No.: 125,337

[22] Filed: Sep. 22, 1993

[51] Int. Cl.[6] .................. G06F 7/02; H04L 1/00

[52] U.S. Cl. ............... 371/67.1; 371/45; 371/36; 371/47.1

[58] Field of Search ............... 371/67.1, 48, 24, 371/7, 36, 45, 47.1, 39.1, 38.1, 37.1, 42, 46, 5.1, 5.3, 5.4, 57.1, 57.2; 375/67, 83, 108, 106, 110, 20, 87, 10

[56] References Cited

U.S. PATENT DOCUMENTS

| | | | |
|---|---|---|---|
| 3,571,794 | 3/1971 | Tong | 340/146.1 |
| 4,156,867 | 5/1979 | Bench et al. | 340/146.1 |
| 4,709,376 | 11/1987 | Kage | 373/58 |
| 4,818,987 | 4/1989 | Ide et al. | 340/825.47 |
| 4,837,854 | 6/1989 | Oyagi et al. | 455/343 |
| 5,038,351 | 8/1991 | Sakai et al. | 371/47.1 |
| 5,212,690 | 5/1993 | Löw | 370/108 |
| 5,289,476 | 2/1994 | Johnson et al. | 371/37.1 |

FOREIGN PATENT DOCUMENTS

| | | |
|---|---|---|
| 61-148939 | 7/1986 | Japan . |
| 5063693 | 3/1993 | Japan . |

*Primary Examiner*—Robert W. Beausoliel, Jr.
*Assistant Examiner*—Phung My Chung
*Attorney, Agent, or Firm*—Dorr, Carson, Sloan & Birney

[57] ABSTRACT

A fault tolerant protocol for determining the beginning of data despite the presence of burst errors in a frame of transmitted data. The fault tolerant protocol of the present invention provides in the frame of transmitted data a plurality of different preamble characters, P, in a prearranged order before the beginning of data. The frame of transmitted data before the plurality of preamble characters is a plurality of identical synchronization characters, S. The protocol of the present invention detects a predetermined number, n, of sequential synchronization characters in the plurality, s, of synchronization characters. Upon detection, a synchronization signal is issued indicating acquisition of synchronization. Upon receipt of the synchronization signal, the invention detects a majority, m, of preamble characters in the plurality of preamble characters. When a majority of the preamble characters have been detected, the beginning of data is determined.

16 Claims, 7 Drawing Sheets

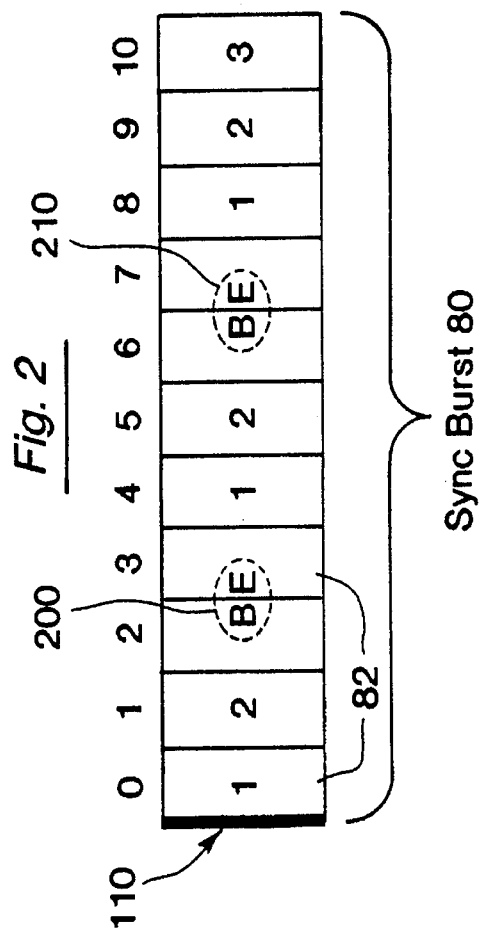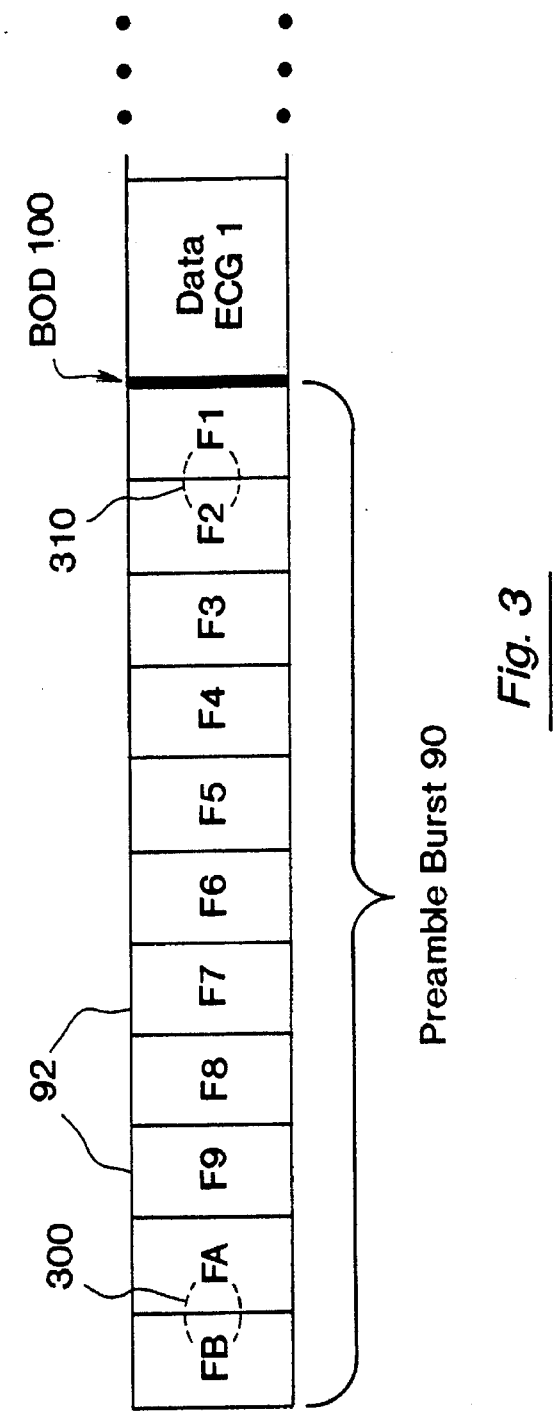

| C1 | C2 | C3 | D1 | D2 |
|----|----|----|----|----|
| 0 | 0 | 0 | 0 | 0 |
| 1 | 0 | 0 | 1 | 0 |
| 0 | 1 | 0 | 0 | 1 |
| 1 | 1 | 0 | 1 | 0 |
| 0 | 0 | 1 | 0 | 0 |
| 1 | 0 | 1 | 1 | 1 |
| 0 | 1 | 1 | 0 | 1 |
| 1 | 1 | 1 | 1 | 1 |

FAULT TOLERANT FIBER OPTIC PROTOCOL FOR DETERMINING BEGINNING OF DATA

BACKGROUND OF THE INVENTION

1. Field of the Invention

The present invention relates to fault tolerant data transmission and, more particularly, to a fiber optic fault tolerant protocol acquiring synchronization and recognizing the beginning of data and error correction group boundaries despite the occurrence of burst errors in the received stream of characters.

2. Statement of the Problem

In fiber optic data transmission systems (and other types of data transmission systems), "burst" errors occur. "Burst" errors are usually four to five bits in length, are based on a Gaussian distribution, and as the rate of data transmission increases, are more likely to occur.

A number of conventional Error Correction (EC) techniques are available for correcting errors in frames of the transmitted data. A problem exists with conventional EC techniques when burst errors occur in the framing information used to indicate the beginning of the data (BOD), which corresponds with the beginning of a plurality of Error Correction Groups (ECGs). When this class of errors (i.e., framing information errors) occurs, it is not possible to correct the subsequent ECGs since the location of the BOD is unknown. When framing information burst errors exist, EC techniques are not applicable and the frame must be retransmitted or lost. Hence, a need exists to provide the location of the BOD and/or ECG boundaries even in the presence of multiple burst errors occurring in the framing information. The framing information contains a plurality of identical sync characters that provide synchronization by the receiving circuitry with the transmitted frame. When burst errors occur in the sync characters, synchronization may not occur and the frame must be retransmitted or lost. A need also exists to acquire synchronization for the frame even in the presence of multiple burst errors. Conventionally, different types of framing data may follow the framing information. A need also exists to provide information as to the identity of the ECGs following the BOD. When synchronization is not acquired or when the BOD is not detected, a need exists to provide an overall error flag.

3. Prior Approaches

The 1971 patent to Tong (U.S. Pat. No. 3,571,794) pertains to an automatic synchronization recovery for data systems utilizing burst error-correcting cyclic codes. This invention handles errors occurring simultaneously at each end but not in the middle of a data word. A specific preselected data sequence is added to each data word transmitted and the same fixed sequence is subtracted from the received data sequences. This approach distinguishes itself from the aforesaid statement of the problem by providing separate information along with the data.

The 1991 patent to Sakai et al. (U.S. Pat. No. 5,038,351) pertains to a coded mark inversion (CMI) block sync circuit. This approach is based on the CMI code wherein a binary code "1" is represented by one of alternately repeated "00" or "11" and wherein "0" of a binary code is represented by either "01" or "10." Sakai counts violated bits of input CMI codes within a supervisory section. This approach distinguishes itself from the statement of the problem through utilization of the CMI code.

The 1979 patent to Bench et al. (U.S. Pat. No. 4,156,867) uses a start code to define the beginning of the data block and to enable synchronization. The start code has a set number of a correlatable pattern of binary bits such as thirty-two.

4. Solution of the Problem

The present invention provides solutions to the above-stated four problems by employing two burst sequences in the framing information that together allow for a maximum statistical recognition of the BOD and/or the ECG boundaries. The present invention utilizes the technique herein defined as "sync burst." "Sync burst" is a burst of multiple sync characters that allows for the detection of a predetermined sequential number of sync characters in the presence of multiple channel burst errors. The present invention teaches that by requiring multiple sync characters, the possibility of false synchronization is significantly reduced. Upon detection of the predetermined sequential number of sync characters, synchronization is acquired and a sync signal is issued.

The second feature of the present invention is the provision of a preamble burst immediately following the sync burst. The preamble burst as used herein is designed as a known sequence of characters in which some majority of these characters are correctly recognized so as to provide the BOD. By incorporating both sync burst and preamble burst, the BOD is recognized even when a certain number of channel burst errors are present in the framing information.

Associated with each character in the preamble burst is a nibble identifying the type of upcoming ECG. This third feature is optional with the present invention.

Finally, if detection of the preamble burst does not occur within a predetermined time interval after the sync signal is issued, then an overall error flag is raised.

SUMMARY OF THE INVENTION

A fault tolerant protocol for determining the beginning of data in the presence of burst errors is disclosed. The fault tolerant protocol of the present invention provides in the frame of transmitted data a plurality of different preamble characters, P, in a prearranged order before the beginning of data. Optionally included in each preamble character is the identity of the transmitted data. Also provided in the frame of transmitted data before the plurality of preamble characters is a plurality of identical sync characters, S. The protocol of the present invention detects a predetermined number, n, of sequential sync characters in the plurality of sync characters even in the presence of burst errors. Upon detection, a sync signal is issued indicating acquisition of synchronization. The protocol of the present invention upon receipt of the sync signal detects a majority, m, of preamble characters in the plurality of preamble characters even in the presence of burst errors. The identity of the transmitted data is also detected at this time. When a majority of the preamble characters has been detected, the beginning of data is determined. An overall error flag is provided in the event the majority, m, is not detected with a predetermined time interval.

DESCRIPTION OF THE PREFERRED EMBODIMENT

1. Overview

Figure 1:
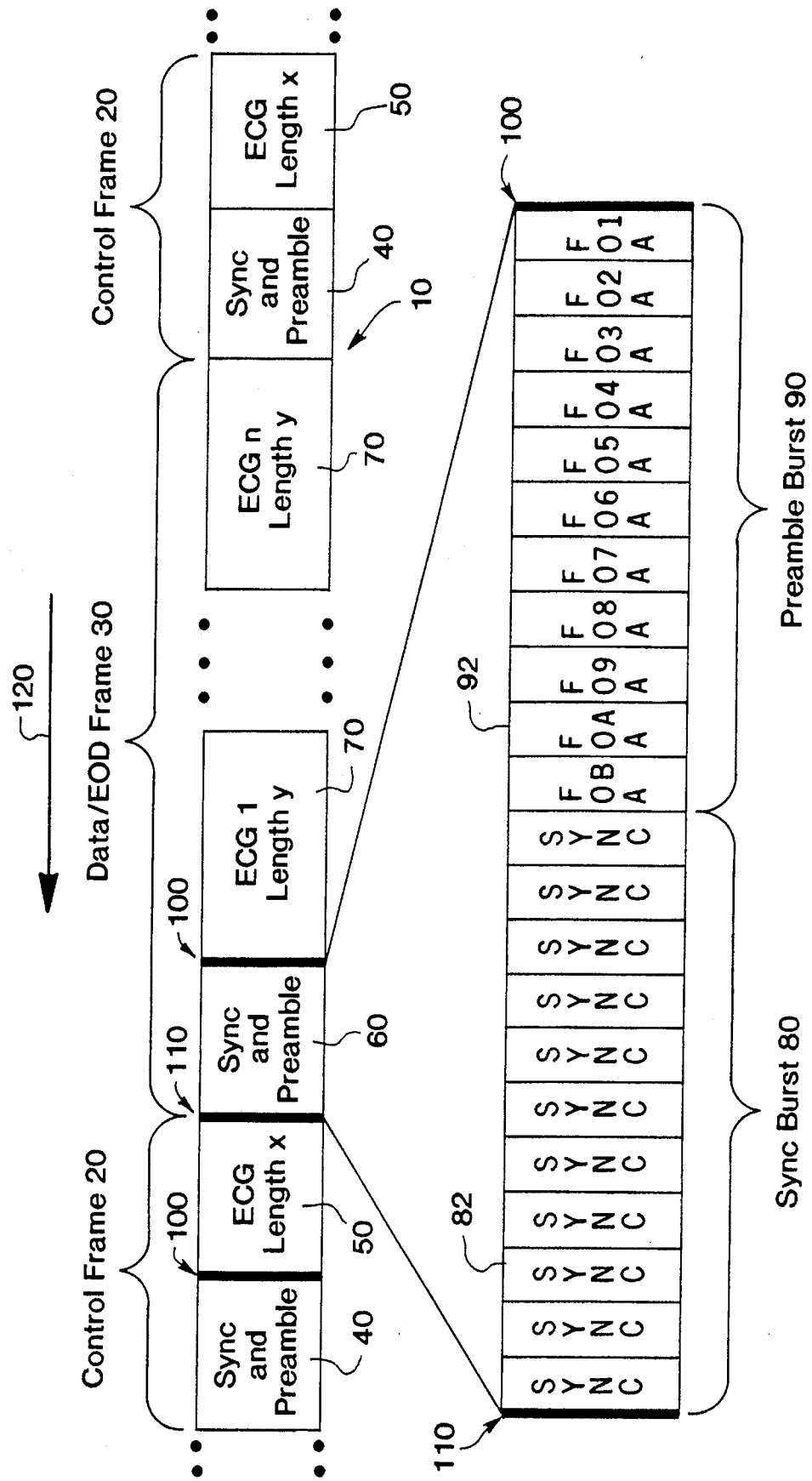
FIG. 1 sets forth the frame format of the transmitted serial data of the present invention detailing the sync burst and preamble burst fields in the framing information of the present invention, FIG. 2 sets forth an illustration of two burst errors occurring in the sync burst field, FIG. 3 sets forth an illustration of two burst errors occurring in the preamble burst field.

In FIG. 1, the framing protocol used in the full duplex data communication between two unidirectional serial fiber optic links is shown. The process of communication critically involves the recognition of the BOD resident in the received serial streams. For consistency throughout this application, reference to BOD shall commonly refer to "beginning of data" and/or "the ECG boundary."

In FIG. 1, the serial stream 10 conventionally includes an information or control frame followed by a data or end of data (EOD) frame. The data stream flows in the direction of arrow 120. These two frames then serially repeat for new data frames. Frame boundary 110 separates the frames 20 and 30. Each information frame, in turn, contains a "sync and preamble" field 40 followed by an ECG 50 having a length such as X. Each data/EOD frame 30 also has a "sync and preamble" field 60 followed by a plurality of ECGs (ECG 1 to n) 70. Each ECG 70 has a length such as "Y." The goal of the present invention is to locate with statistical certainty the BOD 100 in the presence of burst errors so that the ECGs can be processed.

To ascertain the location of the BOD 100, the present invention provides a sync burst field 80 and a preamble burst field 90. The sync burst field 80 comprises a plurality of identical sync characters 82 and the preamble burst field 90 includes a plurality of different preamble characters 92 arranged in a prearranged order.

As will be explained in more detail, each sync identical character 82 is preferably a fixed number based on the transmission protocol, and in the preferred embodiment, eleven sync characters 82 are utilized. Likewise, in the preferred embodiment, each preamble character is identical and eleven preamble characters are utilized. It is to be understood that the precise number of bits in each sync character 82 and in each preamble character 92 as well as the actual number of sync characters 82 and preamble characters 92 may vary, under the teachings of the present invention, with the specific fault tolerant fiber optic protocol design requirements.

2. Fault Tolerancy

As will be discussed, one goal of the present invention is to provide for recognition of the BOD 100 in the presence of burst errors so that the processing of the ECGs (ECG 1 to ECG n) occurs. This goal eliminates the requirement of retransmitting the data frame 30.

The detection of BOD 100, under the teachings of the present invention, is designed to be fault tolerant. It is to be understood that the present invention provides a solution that is based on statistics and probabilities. The present invention preferably is designed to be fault tolerant in the presence of at least two independent burst errors in the framing structure. This represents a high degree of fault tolerance due to the extreme importance of recognizing frames. It is to be understood, however, that while this is the goal of the preferred embodiment, the invention is not so restricted and it would find application when BOD recognition occurs only in the event of one independent burst error occurring.

The present invention first assumes that each burst error event is independent. This means that each burst error is equally probable and is not conditional on any other event. Furthermore, it is secondly assumed that a burst error probability exists on the order of 1.e–12. The third assumption is that a single burst error event never causes just one bit to be in error. Rather each burst error is an error whose length will be assumed to be 4 to 5 bits based on a Gaussian distribution. A conventional definition of a burst error is:

Errors occurring in a circuit used for data transmission, where the frequency of errors is such that less than a given number of correct bits occurs between error bits. *Dictionary of Computers, Information Processing and Telecommunications,* Rosenberg (2d ed.) Wiley (1987).

3. Sync Burst Protocol

When the serial stream as shown by arrow 120 in FIG. 1 is received, the conventional optical/electrical conversion circuitry has no idea where the boundaries reside within the received serial fiber optic transmission 10. The sync characters 82 are utilized to acquire synchronization. There are eleven identical sync characters in every sync burst, and in the preferred embodiment, the characters used for synchronization are the ten-bit control value k28.1 of the IBM 8E–10b Encoding Definition. See "A DC-Balanced, Partitioned-Block, 8B–10B Transmission Code," IBM J. Res. Develop., vol. 27, no. 5, September 1983, p. 440. The use of eleven sync characters 82 under the teachings of the present invention allows for detection of three consecutive sync characters 82 even though two burst error events may have occurred in the eleven-character sync burst. This is an important feature of the present invention to acquire synchronization in the presence of multiple burst errors.

In FIG. 2, the sync burst field 80 is again illustrated with the occurrences of two independent burst errors 200 and 210. Under the teachings of the present invention, three consecutive sync characters 82 must be detected. FIG. 2 shows a worst-case scenario; the burst errors 200 and 210 could be located anywhere within the sync burst field 80. In the worst case, three consecutive sync characters 82 will still be detected, and in this example, consecutive sync characters 8, 9, and 10 illustrate the detection of three consecutive sync characters.

The present invention provides a plurality, S, of identical sync characters, and then, to achieve sync in the presence of burst errors, the present invention detects a predetermined number, n, of sequential sync characters. In the preferred embodiment for achieving synchronization in the presence of two burst errors:

S=11 identical characters n=3 sequential characters.

It is to be expressly understood that any suitable design values for S or n could be chosen under the teachings of the present invention based on the fault tolerant design requirements.

The three consecutive sync characters (for example, 8, 9, and 10 of FIG. 2) are recognized by the Serial-to-Parallel (S-P) function within the conventional Optical/Electrical Conversion circuitry. When the S-P function detects synchronization, it sends a sync signal to the deformatting circuitry.

4. Sync Burst Protocol Circuitry

Figure 10:
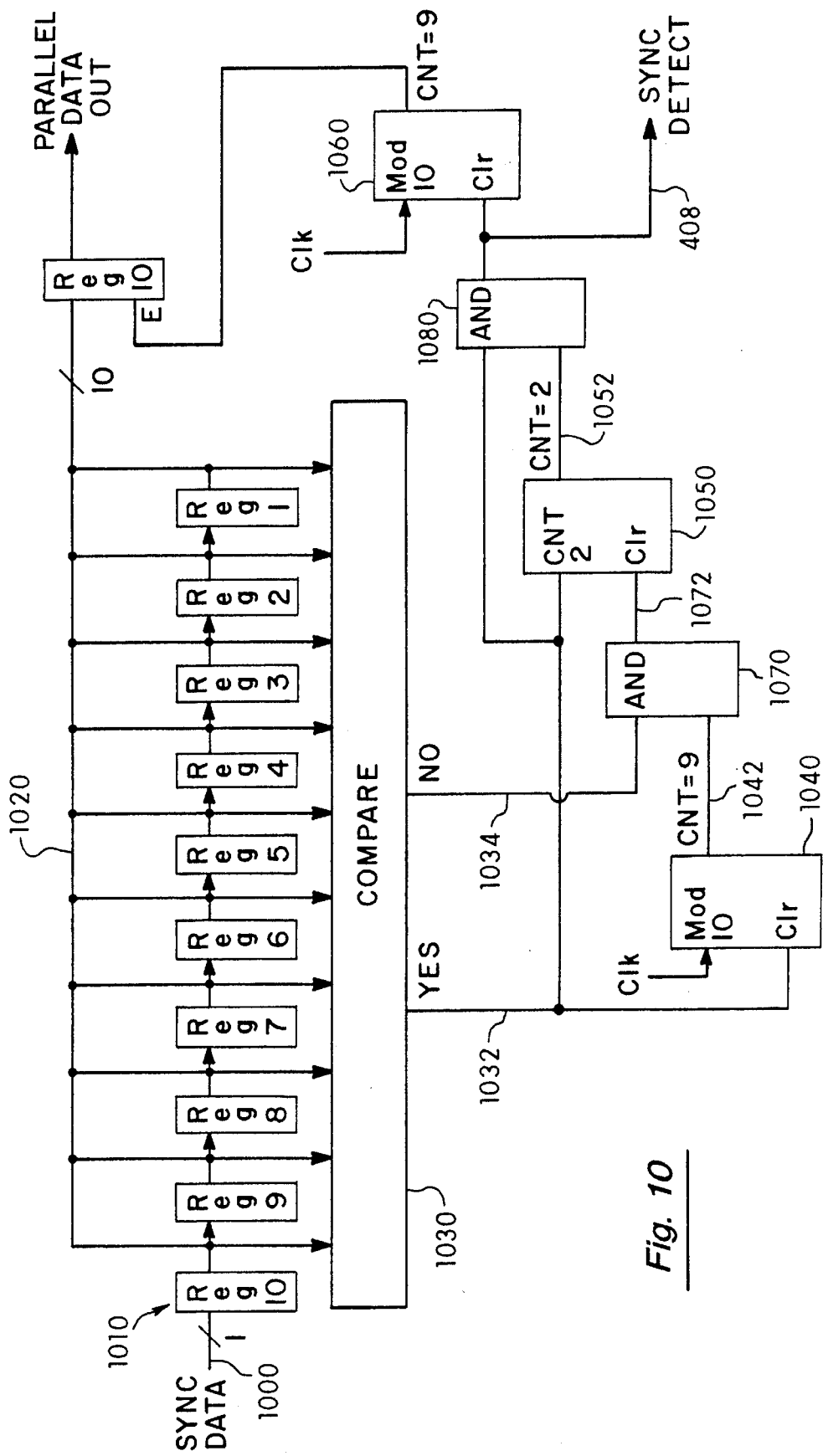
FIG. 10 is the block diagram of the circuit for acquiring synchronization by detecting three successive sync characters.

In FIG. 10, the details of the sync detect circuit are set forth. The sync characters are delivered on line 1000 to a bank of registers 1010. These registers 1010 are labelled Reg. 1–Reg. 10 in FIG. 10. The sync characters are delivered on line 1000 in serial format. Once a character is delivered in, the output of each register 1010 is delivered on lines 1020 to a compare circuit 1030. In the compare circuit 1030 is resident the desired synchronization character according to the k28.1 IBM standard. If the delivered sync character successfully compares to the resident value, a "yes" output is delivered on 1032. If it does not successfully compare, a "no" signal is delivered on line 1034. This circuit looks at one sync character at a time, and the goal is to detect three successive sync characters. To accomplish this, counters 1040, 1050, and 1060 are utilized in conjunction with AND gates 1070 and 1080.

As a first example, assume three correct successive sync characters are received so as to acquire synchronization and to raise the sync signal. In this example, three successive "yes" or match signals are issued on line 1032. In that situation, counter 1040 will be continually reset to zero. Hence, the output on line 1042 will be low so that the output of the AND gate 1070 on line 1072 will also be low so as not to reset counter 1050. Counter 1050 counts to the binary value of "2" and maintains that count until cleared. For example, if five successive matches are found, the count stays at "2." Hence, in this example of three successful matches, after the second successful match (i.e., the count equals "2"), the value on line 1052 is high, and when the third match comes in on line 1032, the output of the AND gate 1080 on line 408 is high, which provides the sync detect signal. The high value on line 408 also resets counter 1060 to zero. At this point in operation, synchronization has been acquired with three successive matches.

In a second example, assume only two successive matches occur. It is clear that even though the output of counter 1050 on line 1052 is high, when the next compare is detected (which is not a match), the output of the AND gate 1080 stays low so as not to reset counter 1060. Hence, sync detect on line 408 is not raised since only two successive matches occurred, since the third sync character did not match.

In all other situations, whenever only a single match occurs on line 1032, modulus 10 counter 1040 is reset. Clock signals Clk cause the counter 1040 to count to 9, resulting in a high signal on lead 1042 that resets counter 1050 so that counter 1050 is always ready to detect successive matches. Counter 1060, when it reaches a count of 9, enables the S-P conversion to take place and to shift the parallel data out.

It is to be expressly understood that the circuitry of FIG. 10 represents a preferred embodiment and that other design approaches could be implemented to perform the same function. Furthermore, FIG. 10 could be modified to raise the sync signal based on any desired number, n, by simply changing the count in counter 1050. The bit width of each sync character could likewise be changed by increasing or decreasing the number of registers 1010.

In summary, a unique fault tolerant method has been set forth for acquiring synchronization 408 of a frame 30 of transmitted data ECG in the presence of burst errors 200, 210. This method provides in the frame 30 of transmitted data ECG a plurality of identical sync characters, S, before the transmitted data. A predetermined number, n, of sequential sync characters in the plurality of identical sync characters, S, are then detected. In the preferred embodiment, n is greater than one and less than S. Upon detection, a sync signal 408 is issued, thereby indicating that sync has been acquired.

5. Preamble Burst Protocol

Once synchronization is acquired, the system must still find the BOD 100 on the beginning of the first ECG (i.e., ECG 1 of FIG. 1), even with the possibility of corrupted data. This is accomplished with the preamble burst field 90 of the present invention. This is a sequence of characters that counts down to the BOD 100. The decoder then looks for a "seven of eleven" majority of characters in that countdown sequence. With this approach, the BOD can be found even if any four of the eleven characters are corrupted. In addition, a timer within the system is activated, and if a majority of preamble characters are not detected within a predetermined time, then an overall error is detected.

As shown in FIG. 1, the upper nibble of each preamble character may contain, under the teachings of the present invention, the following values: F, O, or A. The least significant portion of each preamble character contains a value that decreases with each successive preamble character, and in the preferred embodiment, the prearranged sequence down-counts toward the BOD 100 as follows:

B, A, 9, 8, 7, 6, 5, 4, 3, 2, 1.

The present invention is not limited to a down-count prearranged order or to an up-count prearranged order. Any prearranged order would function under the teachings of the present invention. In the preferred embodiment, each preamble character is different from each other, but this is not a requirement of the present invention. The F value indicates that the upcoming ECG is in the control frame 20, the 0 value indicates that the upcoming ECG is in the data frame 30, and the A value indicates that the upcoming ECG is in the EOD frame. This is an important but optional feature of the present invention (i.e., the preamble protocol identifies the type of ECGs that follow). The present invention is not limited to the provision of this identification feature, and if not required, only the least significant portion of each preamble character would be used.

In FIG. 3, an example of a preamble burst 90 in front of a data-type ECG (i.e., F) series of groups is illustrated. Suppose two burst errors 300 and 310 occur shown in FIG. 3. These burst errors corrupt four of the eleven preamble characters 92. This leaves the following uncorrupted preamble characters:

F9, F8, F7, F6, F5, F4, and F3.

The present invention uses a majority, m, of the plurality of preamble characters, P, to determine the position of the BOD 100 by comparing the detected majority to the prearranged order:

Prearranged order: B A 9 8 7 6 5 4 3 2 1

Detected majority: * * 9 8 7 6 5 4 3 * * where * =corrupted values due to burst errors.

The position of the BOD 100 can now be easily determined based on the prearranged order. With respect to the above example, the BOD 100 occurs two preamble characters after preamble character 3.

In the preferred embodiment for determining the BOD 100 in the presence of two burst errors:

P=11 preamble characters m=7 preamble characters.

It is to be expressly understood that any suitable design value for P and m could be chosen under the teachings of the present invention based upon the fault tolerant design requirements.

6. Preamble Burst Protocol Circuitry

Figure 4:
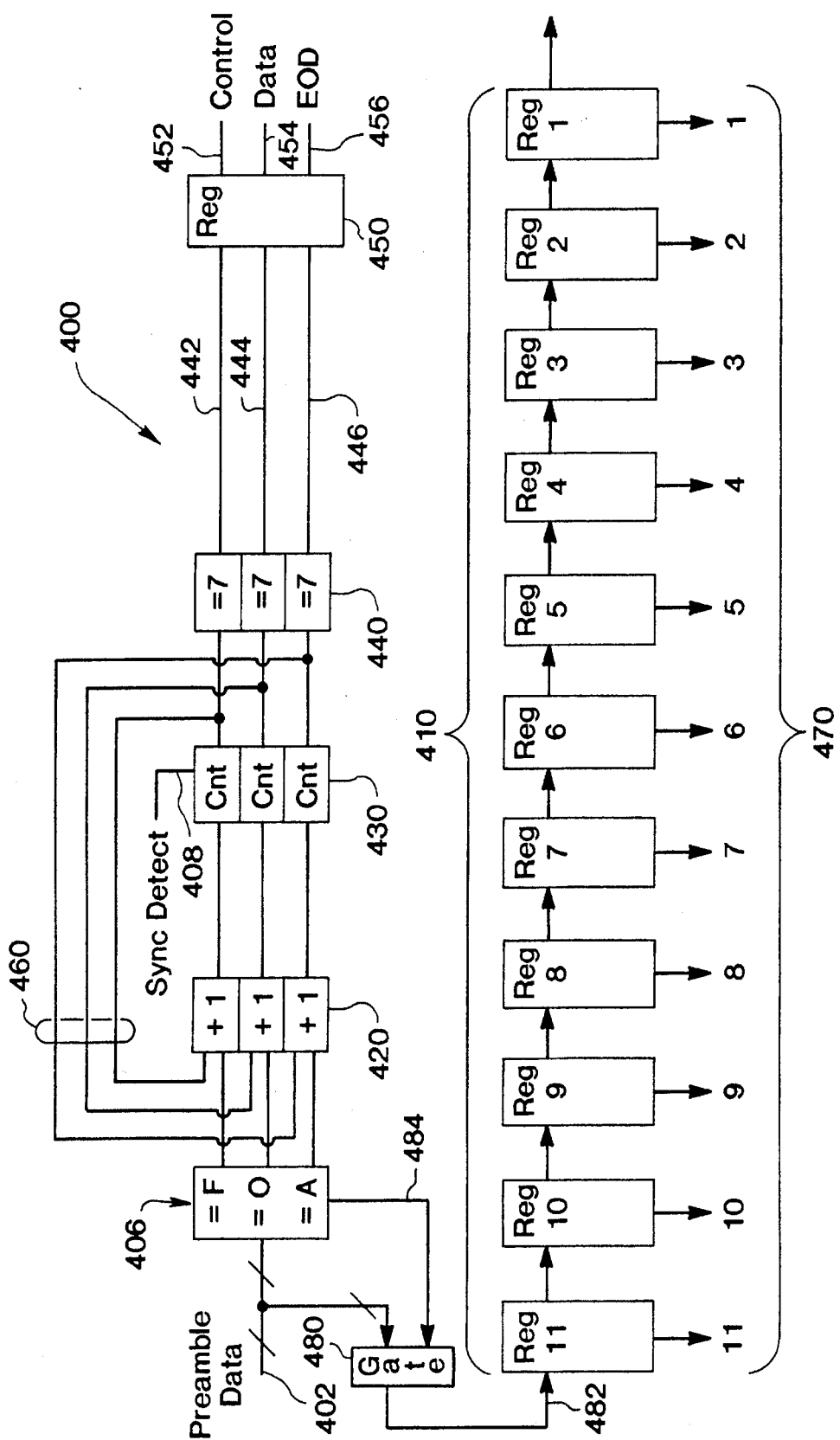
FIG. 4 is the block diagram for the first part of the preamble detect circuit of the present invention, FIG. 5 sets forth the comparator of the present invention, FIG. 6 sets forth the remainder of the preamble detect circuitry of the present invention, FIG. 7 sets forth the block diagram of the number active circuit of FIG. 6.

FIG. 4 sets forth the circuitry necessary to perform the preamble burst protocol. In FIG. 4, the serial data is delivered on eight-bit line 402. The most significant bits representing the upper nibble (i.e., F, O, or A) are delivered into a four-bit register 406.

Preamble detect is accomplished by having a sequence of comparators connected to the preamble shift register. Each time the preamble shift register is shifted, the number of valid comparisons is checked against the preassigned preamble majority value. If the number is greater than or equal to the majority value, majority preamble is realized, and the next byte received is assumed to be the first byte of ECG data.

In FIG. 4, upon issuance of the sync detect signal, line 408 is activated. The preamble data is shifted in on lines 402 with the upper nibble entering shift register 406. The lower nibble is delivered into shift registers 410. As each preamble character 92 is shifted in, the lower nibble is delivered to the next subsequent shift register so that after all eleven preamble characters 92 have been received, the shift registers 410 are filled. Of course, if no burst errors occur, registers 410 will contain the actual preamble characters in the prearranged order: 11, 10, 9, 8, 7, 6, 5, 4, 3, 2, 1.

During this time, register 406, in the presence of no errors, will continually receive one of the following: F, O, or A. For example, assume that F is received. Each time F is received, increment circuit 420 causes the value delivered over lines 460 in a counter 430 to increment by one. Counter 430 becomes activated upon the sync detect signal being issued on line 408. When the value in counter 430 equals seven, as detected by decoder 440, a signal is issued on leads 442, 444, or 446 appropriately. For example, if F is being detected, when seven F's are detected, a signal on line 442 is issued to register 450 and register 450 issues a control signal 452. Of course, in the presence of no errors, the counter 430 would count up to eleven. However, under the teachings of the present invention, which operates in a fault tolerant environment, the counter is set to seven. Therefore, a preamble detect is issued on lines 452, 454, or 456 when seven or more of the upper nibble values are detected for F, O, or A. This also accomplishes another goal of the present invention, which is to determine which type of frame is indicated in the preamble sequence.

In FIG. 4, a gate 480 loads in all zeroes whenever F, O, or A is not detected. When F, O, or A is detected a gating signal is delivered over line 484 to gate in the preamble to registers 410. If not detected then, the preamble is not opted in, thereby causing all zeroes to be entered.

In summary, FIG. 4 sets forth the circuitry for capturing the lower nibble of preamble characters 92 in shift registers 410 and the circuitry for evaluating the upper nibbles for ECG type.

Figures 5, 6:
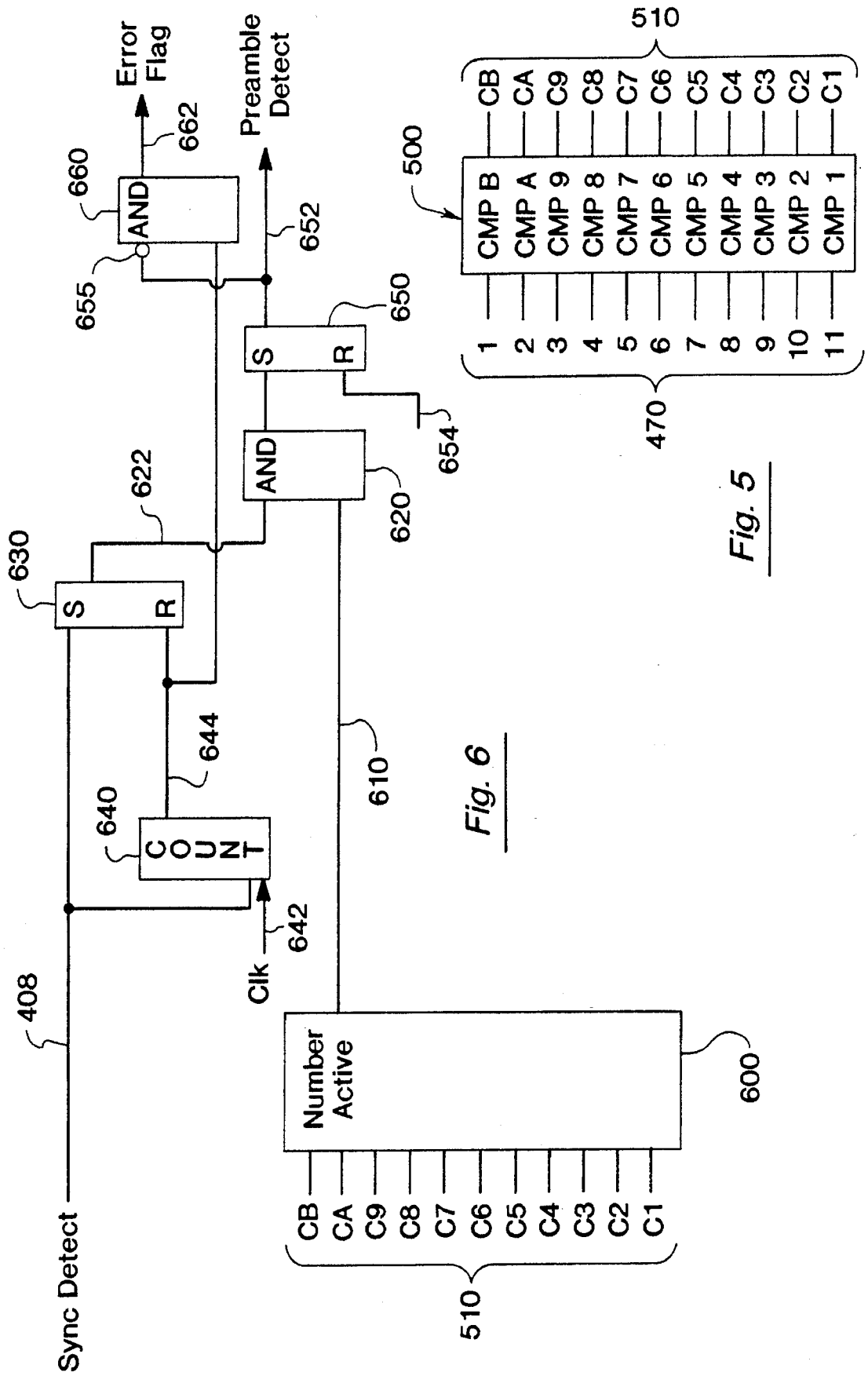

In FIG. 5, the outputs 470 of registers 410 are inputted into a comparator 500 that compares the values in registers 410 with the prearranged sequence of values (i.e., B, A, 9, 8, 7, 6, 5, 4, 3, 2, 1). The output of the comparator 500, 510 (i.e, CB, CA, C9, C8, C7, C6, C5, C4, C3, C2, C1), is delivered into circuitry 600. Circuitry 600 determines how many successful comparisons occurred. If a majority, m, of successful comparison have been made, then a signal is issued on line 610 to AND gate 620. In the preferred embodiment, m=7 and, therefore, seven or more values in registers 410 must successfully compare to the prearranged values in the comparator 500 for a signal to be issued on line 610.

Figure 7:
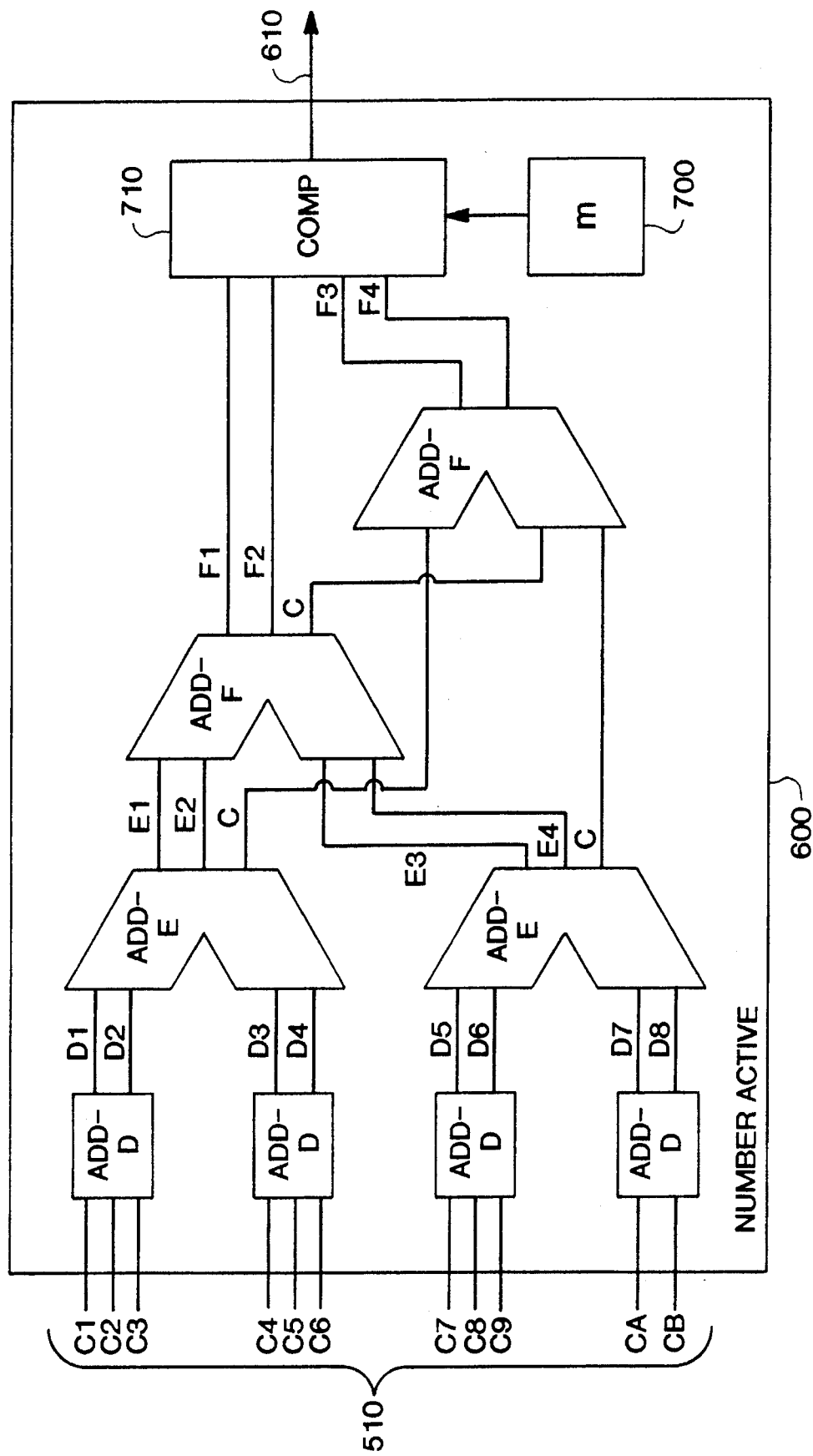

In FIG. 7, the details of the number active circuit 600 are set forth. This circuit adds up the number of successful comparisons generated by the circuitry of FIG. 5 and compares it with the preamble threshold value of m, which in this case is 7. The threshold value is found in the preamble threshold circuit 700 that contains the value of m, which in the preferred embodiment is 7.

In FIG. 7, each stage adds values together. Adders Add-D add the values C1 through CB. Adders Add-E add D1–D4 and generate carry signals "c." Adders Add-F complete the addition and generate values F1–F4. These are delivered into a comparator 710, which compares them to the predetermined value m and if m is greater than the values F1–F4, then the predetermined majority has not been reached, and if the values F1–F4 are greater than the value m, then a signal is generated on line 610. It is to be expressly understood that any type of high-speed adder circuit could be utilized for circuit 600. In the preferred embodiment, the circuit shown in FIG. 7 is used, and in particular, as shown in FIG. 8, one stage of the circuit 600, Add-D for input C1–C3, is shown.

Figures 8, 9:
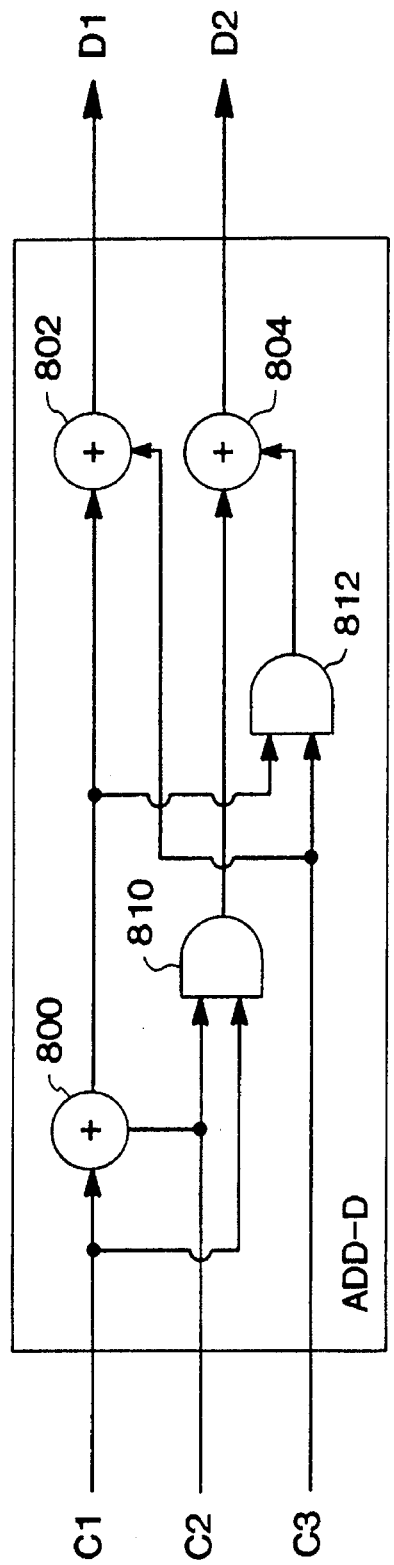
FIG. 8 is the binary logic circuit for one of the adders in the block diagram of FIG. 7.
FIG. 9 is the binary state table of operation for the adder of FIG. 8.

In FIG. 8, the values C1, C2, and C3 are delivered to a series of Exclusive-OR and AND gates. The Exclusive-OR gates 800, 802, and 804 along with the AND gates 810 and 812 are interconnected as shown. In FIG. 9, the state table of operation is set forth. The outputs D1 and D2 are the sum of the inputs C1, C2, and C3. The purpose of the Add-D circuit in FIG. 8 is to count the number of matches in the circuit in FIG. 5. If none of the values match (i.e., C1, C2, and C3 are all zero), then D1 and D2 are also zero. If one of the three are activated, the output count is 1; if two are activated, the output count is 2; and if three are activated, the output count is 3. Again, any suitable circuit performing this function could be utilized under the teachings of the present invention.

AND gate 620 also receives a signal 622. The sync detect signal initially sets flip-flop 630. It also sets counter 640. The counter 640 receives clock cycles on line 642. In the preferred embodiment, when a predetermined number of clock cycles have occurred, the counter 640 reaches a predetermined count value and causes lead 644 to reset flip-flop 630. The resetting of flip-flop 630 disables the AND gate 620. In normal operation, the counter 640 will not reach the predetermined count of clock cycles, thereby not resetting flip-flop 630. Hence, the AND gate 620, upon receiving the majority signal on line 610, sets flip-flop 650. The setting of flip-flop 650 causes a preamble detect signal to be issued on line 652. A signal on line 654 causes the flip-flop 650 to reset so that it is ready for the preamble detect for the next frame. Hence, preamble has been successfully detected even in the presence of multiple burst errors.

In summary, a fault tolerant protocol has been presented wherein the BOD has been ascertained in the presence of burst errors. This is accomplished by providing in the frame 30 of transmitted data ECG a plurality of different preamble characters, P, prearranged in order before the BOD. In the preferred embodiment, the prearranged order constitutes a binary down-count sequence and comprises:

B, A, 9, 8, 7, 6, 5, 4, 3, 2, 1.

A majority, m, of the preamble characters are then detected and compared to the known prearranged sequence so as to determine the BOD.

7. Overall Timeout

Counter 640 reaches the predetermined count, and the resetting of flip-flop 630 deactivates the AND gate 620, which inhibits the setting of flip-flop 650. At this point, lead 652 is low and, hence, when delivered through the invertor input 655 of AND gate 660, an error flag is issued on line 662. This illustrates the feature of the present invention of providing an overall timeout in the event of a missed preamble detection.

In summary and with respect to FIG. 6, the sync detect signal on line 408 resets the count 640, which constitutes a predetermined period. The clock on 642 increments the count. If the majority signal on line 610 does not become active, then the error flag on 662 is issued. If within the predetermined period the preamble detect on line 610 becomes active, then the preamble detect signal is issued on line 652.

The invention has been described with reference to the preferred embodiment. Modifications and alterations will occur to others upon a reading and understanding of this specification. It is intended to include all such modifications and alterations insofar as they come within the scope of the appended claims or the equivalents thereof.

I claim:

1. A fault tolerant protocol for determining the beginning of data in a frame of transmitted data in the presence of burst errors, said fault tolerant protocol comprising the steps of:

providing in the frame of transmitted data a plurality of different preamble characters, P, in a prearranged order before the beginning of data, providing in the frame of transmitted data a plurality of identical sync characters, S, before the plurality of preamble characters, detecting a predetermined number, n, of sequential sync characters in the plurality of identical sync characters, S, in the presence of the burst errors, issuing a sync signal upon the detection of the predetermined number, n, of sequential sync characters in the aforesaid step, detecting a majority, m, of preamble characters in the plurality of preamble characters, P, in the presence of the burst errors and in response to the issuance of the sync signal, determining the beginning of data based on the order of the detected majority, m, of said preamble characters in comparison to the prearranged order of the plurality of preamble characters, P.

2. The fault tolerant protocol of claim 1, further comprising the step of:

issuing an error flag signal when (i) a predetermined time period expires and (ii) the step of detecting a majority, m, of preamble characters fails to occur within the predetermined time period.

3. The fault tolerant protocol of claim 1 further comprising the steps of:

providing in each preamble character the identity of the transmitted data, detecting a majority, m, of preamble characters having the same identity in the presence of the burst errors and in response to the issuance of the sync signal, issuing a signal corresponding to the identity detected in the aforesaid step.

4. The fault tolerant protocol of claim 1 wherein n=3 and S=11.

5. The fault tolerant protocol of claim 1 wherein m=7 and P=11.

6. The fault tolerant protocol of claim 1 wherein the prearranged order of the plurality of preamble characters, P, constitutes a binary down-count sequence.

7. The fault tolerant protocol of claim 6 wherein the binary down-count sequence is:

B, A, 9, 8, 7, 6, 5, 4, 3, 2, 1.

8. A fault tolerant protocol for determining the beginning of data in a frame of transmitted data in the presence of burst errors, said fault tolerant protocol comprising the steps of:

providing in the frame of transmitted data a plurality of different preamble characters, P, in a prearranged order before the beginning of data, providing in the frame of transmitted data a plurality of identical sync characters, S, before the plurality of preamble characters, detecting a predetermined number, n, of sequential sync characters in the plurality of identical sync characters in the presence of the burst errors wherein n is greater than one, issuing a sync signal upon the detection of the predetermined number, n, of sequential sync characters in the aforesaid step, issuing a signal corresponding to the identity of the transmitted data detected in the aforesaid step, detecting a majority, m, of preamble characters in the plurality of preamble characters in the presence of the burst errors and in response to the issuance of the sync signal, determining the beginning of data based on the order of the detected majority, m, of said preamble characters in comparison to the prearranged order of the plurality of preamble characters, issuing an error flag signal when (i) a predetermined period expires and (ii) the step of detecting a majority, m, of preamble characters fails to occur within the predetermined period.

9. The fault tolerant protocol of claim 8 wherein n=3, S=11, m=7, and P=11.

10. The fault tolerant protocol of claim 8 further comprising the steps of:

providing in each preamble character the identity of the transmitted data, detecting a majority, m, of preamble characters having the same identity in the presence of the burst errors and in response to the issuance of the sync signal, issuing a signal corresponding to the identity detected in the aforesaid step.

11. The fault tolerant protocol of claim 8 wherein the prearranged order of the plurality of preamble characters, P, constitutes a binary down-count sequence.

12. The fault tolerant protocol of claim 11 wherein the binary down-count sequence is:

B, A, 9, 8, 7, 6, 5, 4, 3, 2, 1.

13. A fault tolerant system for determining the beginning of data in a frame of transmitted data in the presence of burst errors, said fault tolerant system comprising:

an information portion in said frame, located before said transmitted data, said information portion having:

(a) a preamble burst field having a plurality of different preamble characters, P, formed in a prearranged order, (b) a sync burst field having a plurality of identical sync characters, S, said sync burst field located before said preamble burst field, means for detecting a predetermined number, n, of sequential sync characters in said sync burst field in the presence of said burst errors, means for issuing a sync signal upon the detection of said predetermined number, n, of sequential sync characters by the aforesaid detecting means, means for detecting for the majority, m, of preamble characters in said preamble burst field in the presence of said burst errors and in response to the issuing of said sync signal by said issuing means, means for determining said beginning of data based on said detected majority, m, of preamble characters by the aforesaid means in comparison to said prearranged order of said preamble characters in said preamble burst field.

14. The system of claim 13 wherein n=3, S=11, m=7, and P=11.

15. The system of claim 13 wherein the prearranged order of the plurality of preamble characters, P, constitutes a binary count-down sequence.

16. The system of claim 13 further comprising means for issuing an error flag signal when said means for detecting the majority, m, fails to detect within a predetermined time period.

* * * * *